J. D. CASEY.
WHEEL.
APPLICATION FILED OCT. 5, 1916.
1,233,842.
Patented July 17, 1917.
2 SHEETS—SHEET 1.
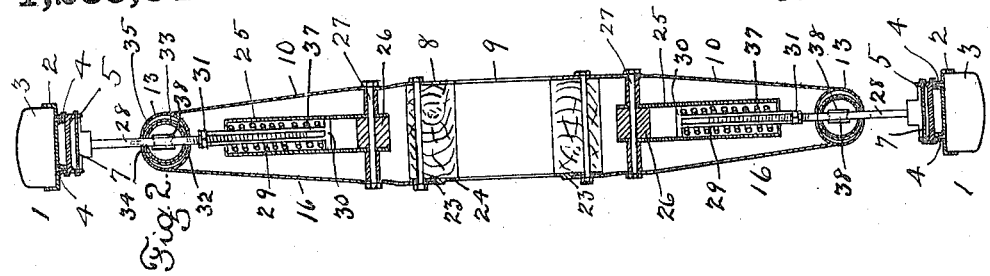
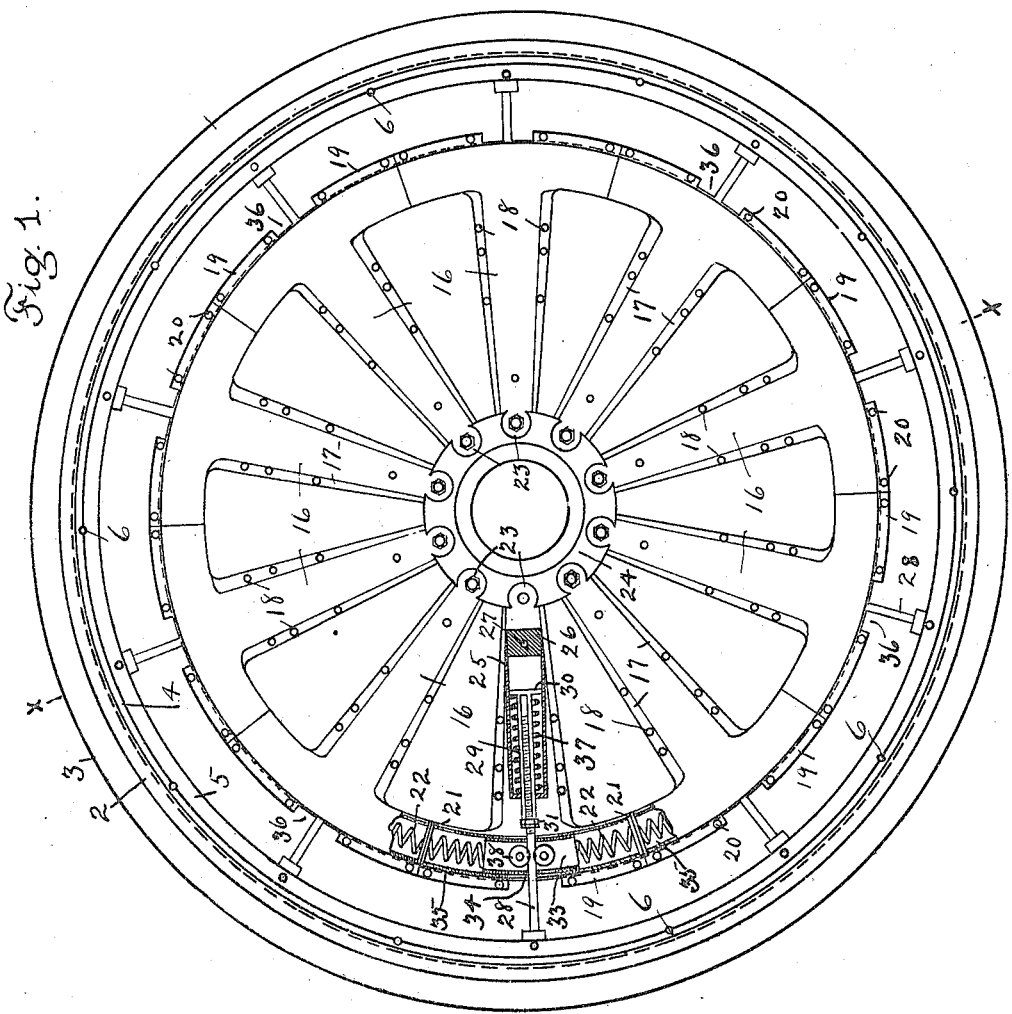
Witnesses:
Charles Fekel
Thelma Bewley
Inventor.
James D. Casey
By Chapman Ferguson
Attorneys

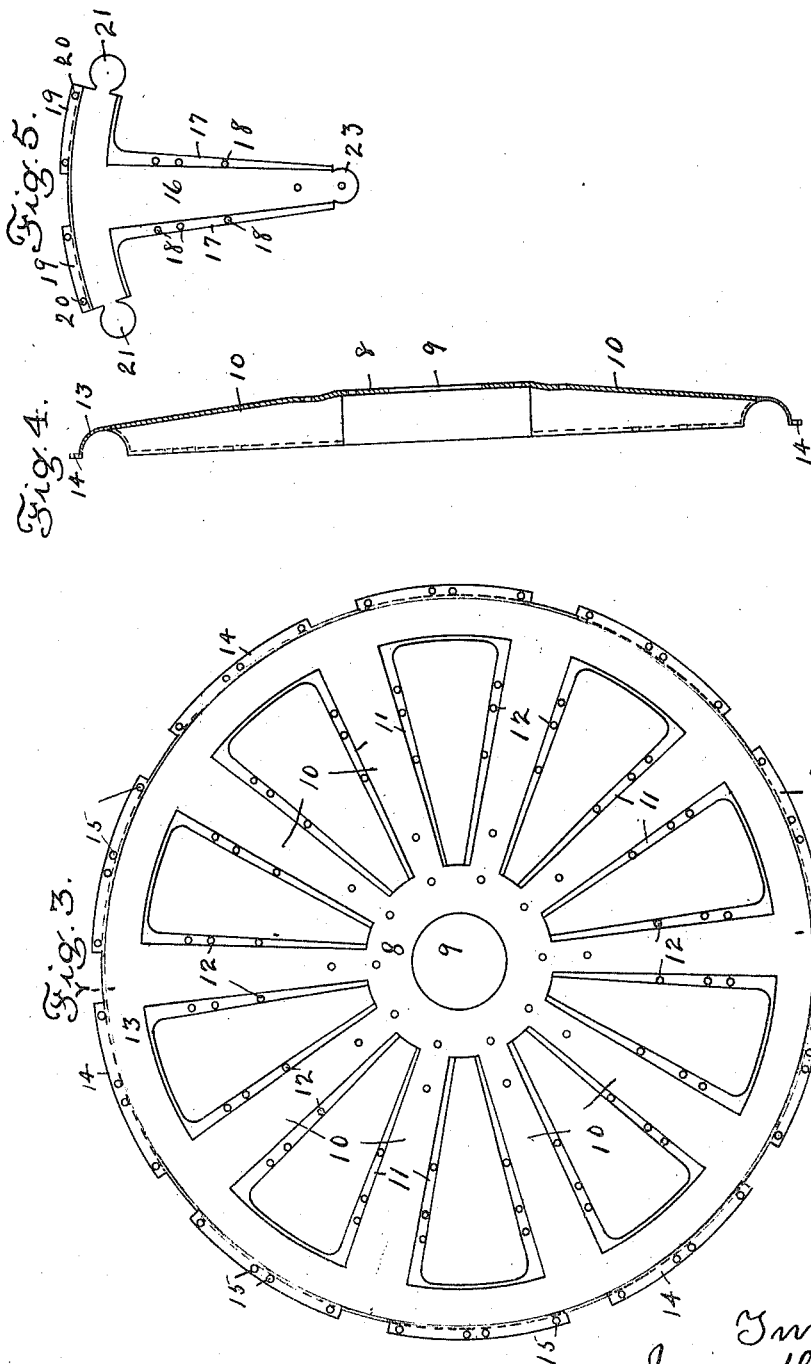
J. D. CASEY
WHEEL.
APPLICATION FILED OCT. 5, 1916.
1,233,842.
Patented July 17, 1917.
2 SHEETS—SHEET 2.

UNITED STATES PATENT OFFICE.

JAMES D. CASEY, OF BALTIMORE, MARYLAND.

WHEEL.

1,233,842. Specification of Letters Patent. Patented July 17, 1917.

Application filed October 5, 1916. Serial No. 123,827.

*To all whom it may concern:*

Be it known that I, JAMES D. CASEY, a citizen of the United States, residing at Baltimore, in the State of Maryland, have invented certain new and useful Improvements in Wheels, of which the following is a specification.

This invention relates to improvements in wheels, and has for its object to provide a device especially adapted for use on automobiles and motor vehicles whereby the pneumatic tires generally in use on such vehicles may be dispensed with, at the same time retaining the cushioned effect produced by said pneumatic tires.

The invention consists of the novel construction and arrangement of the parts and combination of parts hereinafter more fully set forth in the following specification and pointed out in detail in the appended claim.

In the accompanying drawings,—

Figure 1 is a side elevation, partly in section.

Fig. 2 is a vertical sectional view, on the line x—x of Fig. 1.

Fig. 3 is a detail side elevation of one face of the inner wheel.

Fig. 4 is a vertical section on the line Y—Y of Fig. 3.

Fig. 5 is a detail view of one of the removable spokes of the inner wheel, showing the circular end pieces before they are bent in.

Referring to the accompanying drawings, forming part of this specification, and in which like reference numerals designate like parts throughout the several views thereof, 1 designates the outer wheel within which is resiliently connected the inner wheel. The outer wheel 1 is formed of the metal rim 2 in which the tire 3 is fitted and having integral flanges 4 on its inner surface, and the metal rim 5 against which the flanges 4 impinge. The rims 2 and 5 are each provided with segment shaped apertures which form the openings 6 when fitted together. Bolts 7 pass through the openings 6 thus forming a demountable rim. The inner wheel is composed of two faces, the face 8 of which has a central aperture 9 through which the axle projects, and a number of integral spokes 10 which diverge toward their outer ends and are each provided with a flange 11 on each side having holes 12 therein. The rim 13 of the face 8 is semicircular in cross-section and has a number of flanges 14 projecting therefrom each provided with a number of apertures 15. The other face of the inner wheel is composed of a number of removable spokes 16 which diverge toward their outer ends and a flange 17 on each side having apertures 18 therein which correspond to the apertures 12 in the flange 11 and through which bolts pass to hold said flanges together. The outer ends of said spokes 16 are provided with flanges 19 having apertures 20. The flanges 19 rest against and are held to the flanges 14 by bolts passing through the apertures 15 and 20. The outer segment-shaped ends of the spokes 16 are provided on opposite ends with circular pieces 21 which when bent at right angles fills the circular space in the rim and which impinges against each other when the spokes are all in position forming an abutting surface for one end of the springs 22. The inner ends of the removable spokes 16 are provided with heads 23 which fit into similar-shaped recesses in the face of the removable hub-plate 24. Between the hub-plate 24 and the face 8 is a wooden block designed to keep the two faces of the wheel the proper distance apart and also to form a hub for the wheel. The axle of the vehicle projects through both faces of the wheel and through said wooden block. Between each of the removable spokes 16 and the integral spokes 10 of the face 8, is a cylinder 25 having a head 26 at its inner end and through which the pivot pin 27 passes. The said pin 27 passes through both the integral and the removable spokes, allowing a sidewise movement of said cylinders between said spokes. These cylinders 25 are each provided with a rod 28 threaded on its inner end and screwed into the internally threaded tube 29 which latter has a head 30 on its inner end. An adjusting nut 31 is threaded upon the rod 28 and impinges against the outer end of the tube 29. The outer ends of the rods 28 project through the apertures 32 in the segment shaped sliding tubes 33, through the apertures 34 in the segment shaped stationary tubes 35 and through the spaces 36 between the flanges 14 and 19 and have their outer ends secured to the rim 5 of the outer wheel. Within each cylinder 25 is a coiled spring 37 surrounding the tube 29 between the outer end of the cylinder and the head 30, which serve to keep the inner and outer wheels in their proper relative position, and also to allow said wheels to yield with respect to each other, thus producing the cushioned effect of the pneumatic tire. The stationary tubes 35 fit within the rim between the circular pieces 21 and the apertures 34 therein are elongated to permit of the circumferential movement of the rods 28. The sliding tubes 33 are provided with apertures 32 through which the rods 28 project, and two small wheels 38 between which the rods 28 operate. Between the ends of the sliding tubes 33 and the circular pieces 21 are coiled springs 22 which permit of the circumferential movement of said tubes 33 and the rods 28.

It will be seen that should any repairs be necessary to one of the cylinders or the springs therein, the said cylinder may be removed by simply removing the spoke adjacent thereto without disconnecting the inner and outer wheels. The tension of the springs in the tubes can also be adjusted by the nuts 31 on the rods 28.

The weight on the wheel will cause the coiled spring 37 to compress in the upper cylinders as the wheel turns, and the coiled springs 22 cushion the rods 28 as they move circumferentially.

Having thus described my invention, what I claim is:

The combination of an outer wheel, an inner wheel comprising a face having a number of integral spokes which diverge toward their outer ends and each having a flange on each side thereof provided with apertures therein, a plurality of removable spokes which diverge toward their outer ends and each having a flange on each side thereof provided with apertures therein, means passing through the apertures of the said flanges to hold the removable spokes to the stationary spokes, a cylinder mounted within each of the spokes, a rod secured in each cylinder and having its outer end secured to the outer wheel, and a coiled spring surrounding said rod within each cylinder.

In testimony whereof I affix my signature in the presence of two witnesses.

JAMES D. CASEY.

Witnesses:
 CHAPIN A. FERGUSON,
 THELMA BEWLEY.

Copies of this patent may be obtained for five cents each, by addressing the "Commissioner of Patents, Washington, D. C."